W. B. THOMAS.
AUTOMATIC BRAKE MECHANISM.
APPLICATION FILED MAY 15, 1913.
1,076,466.
Patented Oct. 21, 1913.
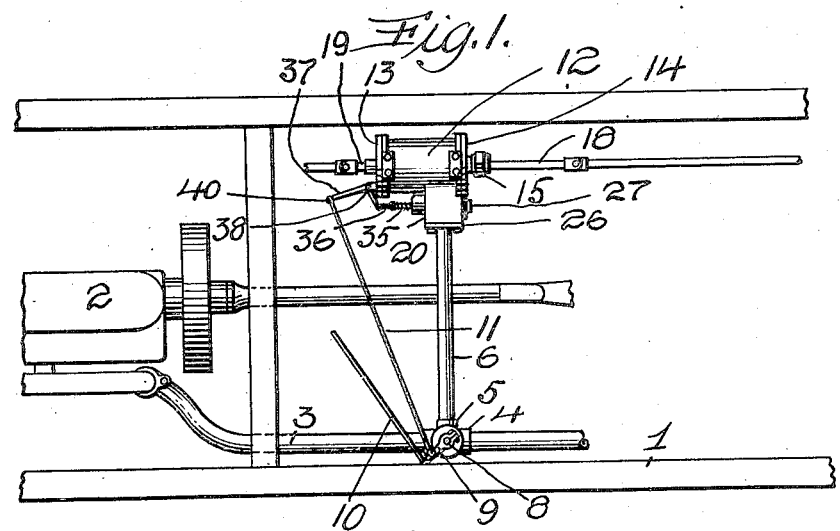
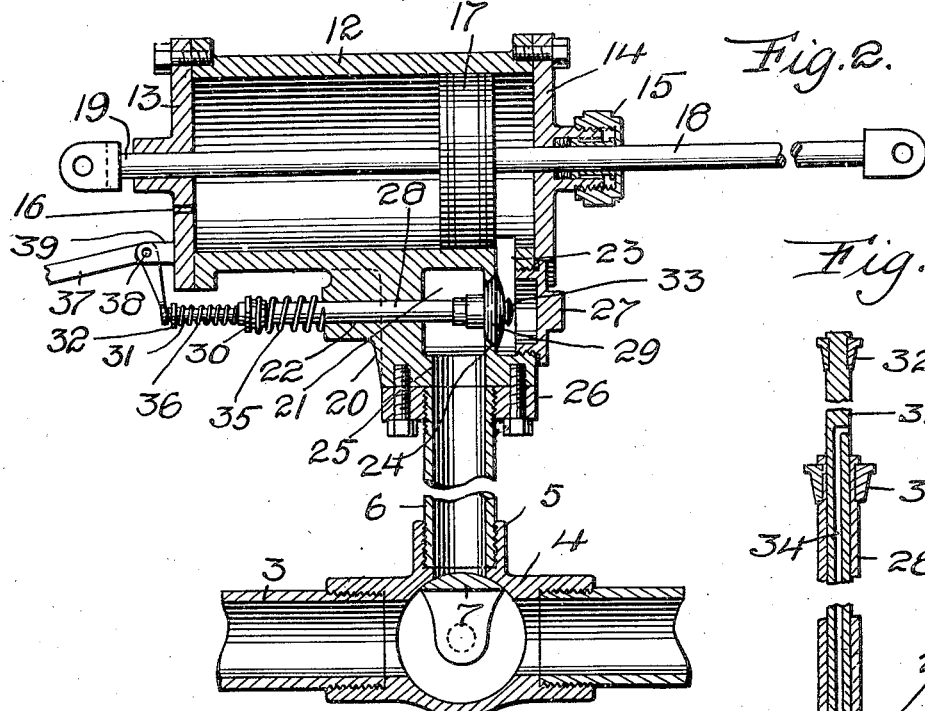
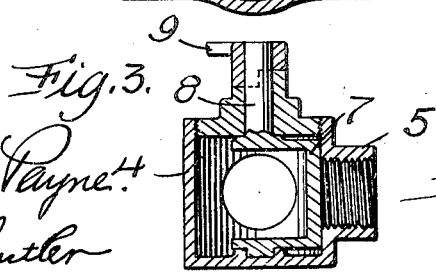
WITNESSES
Samuel Payne
Karl H. Butler
INVENTOR
W. B. Thomas
By Henry C. Evert
ATTORNEY

UNITED STATES PATENT OFFICE.

WILBER B. THOMAS, OF SALEM, OHIO.

AUTOMATIC BRAKE MECHANISM.

1,076,466.   Specification of Letters Patent.   Patented Oct. 21, 1913.

Application filed May 15, 1913.   Serial No. 767,872.

*To all whom it may concern:*

Be it known that I, WILBER B. THOMAS, a citizen of the United States of America, residing at Salem, in the county of Columbiana and State of Ohio, have invented certain new and useful Improvements in Automatic Brake Mechanism, of which the following is a specification, reference being had therein to the accompanying drawing.

This invention relates to an automatic brake mechanism, and the primary object of my invention is to utilize the exhaust from an engine or other source of power for applying brakes in connection with a vehicle.

Another object of this invention is to provide a brake mechanism that can be advantageously used in connection with an automobile, whereby the exhaust from the internal combustion engine can be utilized for actuating the brake mechanism to set the brakes.

A further object of this invention is to provide an automatic brake mechanism that is positive in its action, durable, inexpensive to manufacture, easy to install, and highly efficient for the purposes for which it is intended.

With the above and other objects in view the invention resides in the novel construction, combination and arrangement of parts to be hereinafter specifically described and then claimed.

Reference will now be had to the drawing wherein:

Figure 1 is a plan of a brake mechanism, Fig. 2 is an enlarged longitudinal sectional view of the same, Fig. 3 is a cross sectional view of a valve, and Fig. 4 is a longitudinal sectional view of a valve rod.

In describing my invention by aid of the drawing above referred to I desire to point out that I intend said views as merely illustrative of an example whereby my invention may be applied in practice, and I do not limit my claims to the precise arrangement and construction of parts indicated. The following description is therefore to be construed broadly as including substitute arrangements and constructions which are the obvious equivalent of those shown.

In the drawing, 1 denotes, by the way of an example, a portion of an automobile frame supporting an internal combustion engine 2 which has an exhaust pipe 3. Mounted upon the pipe 3 is a T valve body 4 having a connection 5 provided with a pipe 6. In the valve body 4 is a shutter valve 7 that controls the passage of the connection 5 and the exhaust through the pipe 3. The shutter valve 7 has the stem 8 thereof provided with a crank 9 and pivotally connected to said crank is an operating rod 10 and a connecting rod 11. The operating rod 10 can be moved by hand or foot and the mechanism for shifting this rod forms no part of this invention.

Suspended or otherwise supported by the frame 1 is a cylinder 12 having heads 13 and 14, the latter having a stuffing box 15 and the former a small exhaust port 16. Slidably mounted in the cylinder 12 is a piston head 17 having piston rods 18 and 19 extending through the heads 14 and 13 respectively. The ends of the piston rods can be connected to the brake mechanisms of the forward or rear wheels of a vehicle or either rod used, while the non-used rod is connected to a hand or treadle operating mechanism.

The cylinder 12 has a valve chest 20 provided with a chamber 21, a longitudinal opening 22 in communication with said chamber and a port 23 that establishes communication between the cylinder 12 and the chamber 21 through the medium of a valve seat 24. The valve chest has an opening 25 in communication with the pipe 6, which is connected to said valve chest by a connection 26. The valve chest 20 is provided with a detachable cap or plug 27 whereby easy access can be had to the valve seat 24. Slidably mounted in the opening 22 is a tubular valve rod 28 that has the inner end thereof provided with a main valve 29 and the outer end thereof with a rotatable collar 30.

Slidably mounted in the valve rod is an auxiliary valve rod 31 that has the outer end thereof provided with a collar 32 and the inner end thereof with an auxiliary valve 33 that seats in the valve 29. The auxiliary valve rod has a longitudinal port 34 and with the auxiliary valve 33 seated, the inner end of the port is closed by the walls of the main valve rod 28 and the outer end of the port is open to the atmosphere. Encircling the main valve rod 28 between the collar 30 and the chest 20 is a coiled compression spring 35 that holds the main valve 29 normally seated. Encircling the outer end of the auxiliary valve rod 31, between the end of the main valve rod and the collar 32 is a coiled spring 36 that holds the auxiliary valve 33 normally seated in the main valve 29. Engaging the outer end of the auxiliary valve rod is a bell crank 37 that is pivotally connected, as at 38 to a bracket 29, carried by the head 13 of the cylinder 12. The crank 37 is also pivotally connected, as at 40 to the rod 11, whereby the cranks 9 and 37 can be moved in unison.

Operation: Assuming that the piston rod 18 is connected to a brake mechanism and that the piston rod 19 or the operating rod 10 is connected to a treadle or hand lever, either one can be moved, but it is preferable to utilize the operating rod 10, and further assuming that the vehicle is in use, the internal combustion engine running, and it is desired to apply the brakes, it is only necessary to shift the rod 10. When the crank 9 of the shutter valve 7 is rocked, the shutter valve opens the connection 5 and closes the outlet of the valve body 4, whereby the exhaust will be deflected into the pipe 6. From the pipe 6 the exhaust enters the chamber 21 overcomes the tension of the spring 35, opens the main valve 29, enters the port 23 and the cylinder 12 to shift the piston head 17, whereby the mechanism attached to the piston rod 18 will apply the brakes of the vehicle. The port 16 allows air to exhaust from the cylinder 12 while the piston head 17 is being shifted. When it is desired to release the brakes the operating rod 10 is restored to its normal position, consequently the connection 5 is closed and the spring 35 seats the main valve 29. As the shutter valve 7 is actuated, the crank 37 is moved and shifts the auxiliary valve rod independent of the main valve rod. The spring 36 is placed under tension and the auxiliary valve 33 opened, whereby the cylinder 12 can exhaust through the port 23 into the inner end of the port 34 of the auxiliary valve rod 31 and from said port to the atmosphere. The tension of the spring 36 closes the auxiliary valve when the operating rod 10 is released.

From the foregoing it will be observed that I can utilize the exhaust of an internal combustion engine, for quickly and positively applying the brakes of a vehicle, and that the mechanism as herein shown and described is applicable to various types of automobiles that are driven by internal combustion engines.

What I claim is:—

1. In an automatic brake mechanism, the combination with an exhaust pipe, of a cylinder, a piston head slidably mounted in said cylinder and having a piston rod adapted to be connected to a brake mechanism, a valve chest carried by said cylinder and establishing communication between said cylinder and said exhaust pipe, a shutter valve in connection with said exhaust pipe for deflecting the exhaust of said pipe into said cylinder, and means in connection with said valve chest for controlling the passage of the exhaust to and from said cylinder.

2. In an automatic brake mechanism, the combination with an exhaust pipe, of a cylinder, a piston head slidably mounted in said cylinder and having a piston rod adapted to be connected to a brake mechanism, a valve chest carried by said cylinder and establishing communication between said cylinder and said exhaust pipe, a shutter valve in connection with said exhaust pipe for deflecting the exhaust of said pipe into said cylinder, and means including main and auxiliary valves operable with said shutter valve for controlling the connection between said cylinder and said exhaust pipe.

3. In an automatic brake mechanism, the combination with an exhaust pipe, of a cylinder, a piston head slidably mounted in said cylinder and having a piston rod adapted to be connected to a brake mechanism, a valve chest carried by said cylinder and establishing communication between said cylinder and said exhaust pipe, a shutter valve in connection with said exhaust pipe for deflecting the exhaust of said pipe into said cylinder, a main valve operable in said valve chest for controlling the admission of exhaust to said cylinder, and an auxiliary valve operable in said main valve for controlling the exhaust from said cylinder.

4. In an automatic brake mechanism, the combination with an exhaust pipe, of a cylinder, a piston head slidably mounted in said cylinder and having a piston rod adapted to be connected to a brake mechanism, a valve chest carried by said cylinder and establishing communication between said cylinder and said exhaust pipe, a shutter valve in connection with said exhaust pipe for deflecting the exhaust of said pipe into said cylinder, a main valve operable in said valve chest for controlling the admission of exhaust to said cylinder, an auxiliary valve operable in said main valve for controlling the exhaust from said cylinder, and means operable in unison with said shutter valve for moving said main and auxiliary valves.

5. In an automatic brake mechanism, the combination with an exhaust pipe, of a cylinder in communication therewith, a piston head movable in said cylinder and having a piston rod adapted to be connected to a brake mechanism, a valve carried by said exhaust pipe for deflecting the exhaust of said pipe to said cylinder, and means associated with said cylinder for controlling the passage of the exhaust of said pipe to and from said cylinder.

In testimony whereof I affix my signature in the presence of two witnesses.

WILBER B. THOMAS.

Witnesses:
D. A. WARNER,
LINCOLN DOCKET.